United States Patent
Benattar (10) Patent No.: US 8,821,957 B2
(45) Date of Patent: Sep. 2, 2014

(54) METHOD FOR DEPOSITING A NANOMETRIC THIN FILM ON A SUBSTRATE

(75) Inventor: Jean-Jacques Benattar, Verrieres le Buisson (FR)

(73) Assignee: Commissariat a l'Energie Atomique, Paris (FR)

( * ) Notice: Subject to any disclaimer, the term of this patent is extended or adjusted under 35 U.S.C. 154(b) by 1238 days.

(21) Appl. No.: 12/299,798

(22) PCT Filed: May 11, 2007

(86) PCT No.: PCT/FR2007/000810
§ 371 (c)(1),
(2), (4) Date: Dec. 2, 2008

(87) PCT Pub. No.: WO2007/132089
PCT Pub. Date: Nov. 22, 2007

(65) Prior Publication Data
US 2009/0197064 A1    Aug. 6, 2009

(30) Foreign Application Priority Data

May 15, 2006   (FR) .................................. 06 04297

(51) Int. Cl.
*B05D 3/00*   (2006.01)
*B05D 1/20*   (2006.01)
*B82Y 30/00*   (2011.01)
*B82Y 40/00*   (2011.01)
*B05D 1/00*   (2006.01)
*B05D 3/04*   (2006.01)

(52) U.S. Cl.
CPC *B05D 1/00* (2013.01); *B05D 1/204* (2013.01); *B82Y 30/00* (2013.01); *B05D 3/042* (2013.01); *B82Y 40/00* (2013.01)

USPC ........ 427/2.11; 428/323; 427/429; 427/430.1

(58) Field of Classification Search
USPC ................ 428/323; 427/421, 428, 429, 430.1
See application file for complete search history.

(56) References Cited

U.S. PATENT DOCUMENTS 5,747,152 A * 5/1998 Oka et al. ...................... 428/323
2001/0051223 A1* 12/2001 Bell et al. ...................... 427/421

FOREIGN PATENT DOCUMENTS

WO    2006096571 A2    9/2006

OTHER PUBLICATIONS

Valentini et al., Role of Surface Tension in Slide Coating, 1991, Industrial Engineering Chemical Research, vol. 30, pp. 453-461.*
Chaplin, Gelatin, Water Structure and Science, Mar. 2005, http://www.lsbu.ac.uk/water/hygel.html.*
Nic et al., Newton Black Film, IUPAC Gold Book, Apr. 21, 2012, http://goldbook.iupac.org/N04136.html.*

(Continued)

*Primary Examiner* — Dah-Wei Yuan
*Assistant Examiner* — Andrew Bowman
(74) *Attorney, Agent, or Firm* — Young & Thompson (57) ABSTRACT

The invention concerns in particular a method for depositing a nanometric multilayer thin film on a substrate from a liquid solution containing at least one surfactant. The method includes the following steps: forming a film from the solution; contacting the substrate; and depositing the film on the substrate. The invention is particularly formed to enable depositing black films on different types of surfaces, in particular for obtaining highly organized films. The films obtained by the method are particularly useful in electronics and optics.

21 Claims, 8 Drawing Sheets (56) References Cited

OTHER PUBLICATIONS

Benattar et al., Adhesion of Free Standing Newton Black Film onto a Solid Substrate, May 26, 2006, Angew. Chem. Int. Ed., 45, pp. 4186-4188.*

Jin et al., "Dried foam films: self-standing, water-free, reversed bilayers of amphiphilic compounds", Angewandte Chemie, Supporting Information, Advanced Materials laboratory, National Institute for Materials Science (NIMS), 2005.

* cited by examiner

METHOD FOR DEPOSITING A NANOMETRIC THIN FILM ON A SUBSTRATE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention relates to the field of thin films deposited on a substrate, it relates more particularly to the deposition of thin films, of black film type, and in particular Newton black films (NBF).

2. Description of Related Art Including Information Disclosed Under 37 CFR 1.97 and 37 CFR 1.98

Black films correspond to a state of equilibrium of a surface active film, a so-called free film, which is generally obtained after draining the solvent it contains. Their structure is generally determined by X-reflectivity, which gives access to the thicknesses, rugosities and density of the different strata of this nanometric film. Two types of black film are differentiated: the common black film (CBF) and the Newton black film (NBF). These films are often studied after formation from a surface active solution in water. Unlike biological membranes, in black films, the polar heads of the surface active bilayer are in contact whereas the aliphatic chains are not, indeed the external medium corresponds to an aqueous medium in the former case whereas in the latter it is generally a gaseous atmosphere substantially close to ambient air.

The common black film corresponds to a metastable state of the film which still contains water molecules in liquid state. This type of film may lead to the formation of a Newton black film by evaporation of the liquid water.

The Newton black film is formed of two surface active walls, bonded to one another, without liquid water. The presence of water in the film is nevertheless detected but it corresponds to molecules trapped solid inside the film and which partake to the cohesion thereof. These molecules are not free and are not liable to leave the film inasmuch as the former does not undergo any extreme treatment. The loss of these water molecules is often synonymous with destruction of the film.

It has been shown that the Newton black films form a model system perfectly organized for studying interactions in quite various physicochemical systems (surfactants, polymers, proteins). Thus for instance, a layer of proteins and of modified cyclodextrins has already been inserted inside a black film.

The black films, in spite of the degree of organization that some of them may exhibit, are extremely brittle. Thus, the simplest interferences may lead to the rupture thereof when they are studied according to conventional methods. This brittleness also makes it impossible to find industrially viable applications for this type of structure.

Thanks to the present invention, the inventors provide a simple and smart reply to the brittleness of black films which besides paves the way for numerous applications.

BRIEF SUMMARY OF THE INVENTION

The invention corresponds in particular to a method for depositing a thin nanometric film on a substrate from a liquid solution containing at least one surfactant at a concentration greater than or equal to the critical micelle concentration (cmc), characterised in that it includes the following steps:
  forming a film from the solution,
  contacting the substrate,
  depositing the film on the substrate.

The invention relates to more particularly black film type nanometric thin films and more specific Newton black films (NBF).

The surfactants are molecules comprising a lipophilic part (apolar) and a hydrophilic (polar) part. Among the surfactants useable according to the invention, the following items may be quoted in particular:

i) the anionic surfactants whereof the hydrophilic part is negatively charged; they are selected preferably among compounds of the following formula (III):

$$R_6-A^-, Cat^+ \quad \quad \quad (III)$$

wherein:
  R6 represents a $C_1$-$C_{20}$, preferably $C_1$-$C_{14}$ aryl or alkyl group,
  A- is an anion or a polyanion selected in particular among sulfonates, sulfates, phosphates, carboxylates, sulfosuccinates,
  $Cat^+$ is a cationic counter-ion, preferably selected among the ammonium ion ($NH_4^+$), quaternary ammoniums such as tetrabutylammonium, and alkaline cations such as Na+, $Li^+$ and $K^+$;

It is possible that the same surfactant possesses several A+ type groups, for instance the geminated surfactants have two of them.

ii) the cationic surfactants whereof the hydrophilic part is positively charged; they are selected preferably among quaternary ammoniums of the following formula (IV):

$$(R_7)_4-N^+, An^- \quad \quad \quad (IV)$$

wherein:
  the groups R7, identical or different, represent an aliphatic chain, for instance a $C_1$-$C_{20}$, preferably $C_1$-$C_{14}$ alkyl chain,
  An- is an anion counter-ion selected in particular among boron derivatives such as tetrafluoroborate or halogenide ions such as F-, Br-, I- or Cl-.

It is possible that the same surfactant possesses several positively charged groups, for instance the geminated surfactants have two of them;

iii) the zwitterionic surfactants which are neutral compounds having formal electric charges of one unit and of opposed signs; they possess an even charge number and are selected preferably among compounds of the following formula (V):

$$Z^--R_8-Z^+ \quad \quad \quad (V)$$

wherein:
R8 represents a $C_1$-$C_{20}$, preferably $C_1$-$C_{14}$ alkyl chain,
Z– represents a negatively charged function carried by $R_8$, preferably selected among sulfate and carboxylate,
Z+ represents a positively charged function, preferably ammonium.

iv) amphoteric surfactants which are compounds behaving simultaneously as an acid or as a base according to the medium wherein they are situated; these compounds may be of zwitterionic nature, amino acids are a particular example of this family, soaps prepared by saponification are another example, v) neutral (non ionic) surfactants: surface active properties, in particular hydrophily, are provided by non-charged functional moieties such as an alcohol, an ether, an ester or still an amide, containing heteroatoms such as nitrogen or oxygen; by reason of the small hydrophilic contribution of these functions, non-ionic surface active compounds are most often polyfunctional.

Charged surfactants may obviously carry several charges.

Among the different significations of the aryl moiety of the $R_6$ group of the compounds of formula (III) above, the phenyl cycle, substituted or not, may be quoted in particular, and among the different significations of the $R_6$ alkyl moiety, $C_1$-$C_{20}$, preferably $C_1$-$C_{14}$, advantageously $C_6$-$C_{14}$ alkyl chains.

As a compound of formula (III), dodecylsulfate, dodecyl-benene-sulfonate (SDBS), palmitate, stearate, myristate, di(2-ethylhexyl) sulfosuccinate, methylbenzene sulfonate and ethylbenzene sulfonate, dipalmitoyl phosphate-dylglycerol, in the presence of an alkaline cation, such as sodium, are used preferably.

Among the different significations of $R_7$ groups of the quaternary ammoniums of formula (IV) above, methyl, ethyl, propyl, butyl and tetradecyl groups may be quoted in particular.

As a compound of formula (IV), alkylpyridinium halogenides carrying a $C_1$-$C_{18}$ aliphatic chain, alkylammonium halogenides such as tetradecyltrimethyl ammonium bromide (TTAB), hexadecyltrimethylammonium bromide (CTAB) or dodecyltrimethylammonium bromide or still phospholipids for instance N-[1-(2,3-dioleyloxy)propyl]trimethylammonium salt are used preferably.

As a zwitterionic surfactant, sodium N,N-dimethyldodecyl-ammoniumbutanate, sodium dimethyldodecylammonium propanate and amino acids, dodecylphosphocholine (C12PC), phospholipids such as dimyristoyl phosphatidylcholine, dipalmitoyl phosphatidylcholine, dioleoyl phosphatidylcholine, dimyristoyl phosphatidylethanolamine, dipalmitoyl phosphatidylethanolamine, dioleoyl phosphatidylethanolamine may be quoted in particular as an amphoteric surfactant, disodium lauroamphodiacetate, betaines such as alkylamidopropylbetaine or laurylhydroxysulfobetaine may be quoted in particular.

As non-ionic surfactants, polyethers such as polyethoxylated surfactants such as for instance polyethyleneglycol derivatives and polyethers and in particular of CiEj type, i.e. $C_iH_{2i+1}(OCH_2CH_2)_jOH$, whereof $C_{12}E_6$ and polyethyleneglycol laurylether (POE23 or Brij™ 35, $C_{12}E_{23}$), Tween20™, Tween80™, Triton X100™, Triton X100-R™, polyols (surfactants derivated from sugars) in particular glucose alkylates such as for example glucose hexanate, fluorinated surfactants such as $C_6F_{13}$SOTHAM ($C_6F_{13}CH_2CH_2SOCH_2CH_2CONH(CH_2CH_2OH)_3$) may be quoted.

The list is obviously not exhaustive, among surfactants very complex structures may be found, prepared from molecules whereof the structure has been modified so that they exhibit surface active properties, thus for instance, particular chemical groups may be provided in proteins or cyclodextrins so that they exhibit surface active properties.

The solvent of the solution may be formed of a mixture of solvent, as such, the term "solvent" may designate a mixture as well as a single solvent. The solvent will be selected according to the surfactant employed. Typically the solvent will be selected among polar solvents and more particularly among protic polar solvents, in the case of the mixtures we shall mean of course mixtures exhibiting the features of a protic polar solvent. Thus for instance the solvent may be selected among water, toluene, acetic acid, methanol, ethanol, acetonitrile, dimethyl-formamide, chloroform or the mixtures thereof. Water is the preferred solvent, typically it will be present when a mixture of solvent is employed.

It is preferable that the solvent employed is pure and the inventors consider that its possible purification should be performed with the greatest care.

The concentration of surfactant is greater than or equal to the cmc, it will thus for instance range between the cmc and one hundred times its value, preferably between five and fifteen times. It is preferable that the solution is homogenized before use, to do so agitation is recommended, generally conducted by ultrasounds or by a magnetic agitator. Thus, for instance for $C_6F_{13}$SOTHAM it will be generally ranging between 0.5 and 1 g·l$^{-1}$, for $C_{12}E_6$ around 1 g·l$^{-1}$ or for CTAB it may be close to 5 mM.

The solution will be preferably homogeneous, to do so it is recommended to agitate it before use.

The method will be advantageously carried out in a closed and preferably sealed cabinet. Besides, it is recommended to conduct the method under a solution solvent-saturated atmosphere so as to prevent evaporation of the solvent in the black film in order to confer greater stability thereto.

The choice of the substrate depends on the user and the type of usage the user wishes for the films which will be deposited. Generally speaking any type of substrate may be employed; thus, according to the invention, it is possible to deposit a thin film on a substrate of organic or inorganic nature. It should be noted that solely the surface of the substrate whereon the film will be deposited is relevant within the framework of the present invention, also when the term substrate is employed, it is in no way restrictive and corresponds to the material forming the surface directly in contact with the film; thus, a material consisting of several layers of different compositions, such as an organic molecule-grafted metallic surface, will be considered as a metallic substrate if the surface whereon the film is deposited is the metallic surface. The term "surface of the substrate" corresponds generally to the surface of the substrate whereon the film is deposited.

The substrate employed according to the invention will preferably possess sufficient affinity for the hydrophobic chains of the surfactant. The surface of the substrate exhibits, in such a case, little wettability with the solvent, which is often protic and polar. The wettability of a surface, which relates to surface energy, may be determined by the drop test (deposition of a fluid or deformable solid product) spreading over a surface. The contact angle θ, as presented by T. Young, Phi. Trans. R. Soc. London 95 (1805) 65, provides simple and efficient measurement of the interaction between the surfactant and the substrate. The Young equation connects the contact angle θ to the surface energy of the product by the relation: $\sigma_{SG} = \sigma_{SL} + \sigma_{LG} \cos\theta$, where $\sigma_{SG}$ is the surface energy or tension of the solid-gas zone, $\sigma_{SL}$ the surface energy or tension of the boundary zone between the medium and the sample and $\sigma_{LG}$, the surface energy or tension of the liquidgas zone. Other methods may obviously be employed. It is thus desirable that θ is greater than 45°, preferably 80° and as close as possible to, possibly greater than 90°.

Among the organic substrates it is for instance possible to use polymers, more complex substrates such as biological material. Among the inorganic substrates it is possible for instance to use metals, such as transition metals like Fe, Ti, Au, Pt, Ag, as well as alloys, semiconductors like carbon, for instance in the form of diamond or graphite, silicon carbide or still silicon, mica and glass as well. Most substrates exhibiting a crystalline surface may be employed. Generally speaking it is possible to process the surface of the substrate in order to confer thereto the properties most appropriate the case at hand, for instance silanisation, which corresponds to the grafting of alkyl chains, may be realized on the surface of a glass substrate, a mica or silicon substrate with its native oxide layer to increase its affinity for the hydrophobic chains of the surfactant and decrease its wettability relative to the solvent. Similarly, a silicon surface may be treated using an $NH_4F$-containing solution in order to obtain after rinsing and drying an H-terminated silicon surface which is particularly hydrophobic and lipophilic and which will have little affinity for protic solvents such as water.

The substrate may also be combined, thus for instance a substrate consisting of different materials such as Si and Au will be considered as a combined substrate. The substrates used in electronics are generally of combined nature and are quite adapted to the present invention.

The substrate used should preferably be clean and not contain any impurities so as not to introduce foreign elements between the film and the substrate. To do so, and inasmuch as it corresponds to the user's wish, it is recommended to clean the surface of the substrate. The type of treatment must be adapted to the substrate and corresponds to the methods employed and known to the man of the art. Thus, for instance, for a silicon surface it is possible to employ a treatment with sulphuric acid and hydrogen peroxide, it is a piranha-type solution, to eliminate organic contaminants. Prior to this, rinsing may also be carried out using an organic solvent such as acetone or ethanol by immersing the container in an ultrasound bath to eliminate the dusts and the greases therefrom.

The topography of the surface of the substrate is variable. At macroscopic scale it is possible that the surface is planar; however, it is also possible to employ a non-planar surface while bearing in mind that the deposition of the film on a non-planar surface at macroscopic scale may not always cover the whole surface. Generally, speaking for a set portion of the surface of the substrate to be covered the film formed from the solution must have a surface at least equal thereto. Thus, it is possible to employ a surface topology exhibiting bulges, in such a case the film will generally match the bulges without necessarily covering them down to their base.

As scales smaller than the macroscopic scale, such as at microscopic scale for instance, it is obviously also thinkable of providing a particular topology, for instance if the substrate corresponds to an electronic circuit, the situation is rather similar to the macroscopic cases but generally the surface of the film is sufficiently large to match all the asperities present at the surface.

The different steps of the method are preferably performed successively, they may however be performed quasi-simultaneously but the result is less satisfactory in such a case.

The step of forming a film from the solution may be realized by different processes known in the field. The techniques of preparation of surface active films known to the man of the art are applicable to the present invention. Typically, the film will be formed using the mechanical action of a film formation means traversing the surface of the solution. Inasmuch as a user cannot succeed in providing sufficiently stable a film for being deposited, it is recommended to vary the concentration of surfactant, generally it is desirable to increase it to obtain greater surface coverage at the solvent-external medium interface (air generally). Unstable films break spontaneously.

A film formation means may in particular be formed by a solid medium within which an empty space is provided. Said space is generally immersed in the solution and a film matching its perimeter is then formed after relative displacement of the surface of the solution relative to the space provided in the means. According to a particular embodiment, the means is moved so that the space provided within it runs through the surface. This embodiment corresponds to the technique usually employed for preparing black films, such as those of the Newton black film type, the means corresponds in such a case to a frame, typically substantially rectangular in shape, placed on a plane perpendicular to the surface of the solution. The frame may be wrought in more complex fashion and also enables the formation of several films. It may also enable the formation of non-planar films, and thus for instance be in the form of a semi-cylinder. The displacement of the frame through the surface of the solution leads to the formation of the film.

According to another embodiment the means is placed close to the surface, in the solution or outside it. According to this embodiment, the surface of the solution is moved whereas the means remains fixed. To ensure displacement of the solution, it is desirable to make use of a means of deformation of the surface. This means ensures a variation in average height of the surface so that contact is made between the perimeter of the film formation means and the surface of the solution so as to form a film. By way of means of deformation of the surface, it is possible to employ a wave, the latter may be generated in particular by a vibrating device placed within the solution.

According to a particular embodiment, it is possible to use a means of deformation of the surface and of formation of a film. Such a means generally ensures the formation of a film by deformation of the surface and the full usage of the properties of the surfactants. Thus, for instance, it is possible that the means of deformation is a gas, the injection of a gas into the solution so that a bubble appears at the surface of the solution ensures simultaneously the formation of a film and the deformation of the surface the solution and of that of the film. The size of the bubble may be controlled by the quantity of gas injected. Typically the diameter of the bubble will be ranging between 1 mm and 5 cm.

It is obviously possible to combine these means to obtain the formation of a film; thus, a porous device flush with the surface of the solution may be contemplated, through which a gas would be injected so that a bubble is formed from the porous device. The film formation means and the means of deformation of the surface being in such a case tightly linked.

The step of contacting the film formed from the solution follows that of formation of the film from the solution. It is generally performed by relative movement of the substrate with respect to the surface of the film. Thus the substrate may be moved for making contact with the film, as the film may be moved, typically using a film formation means, or its surface deformed, typically using a surface deformation means, for making contact with the substrate.

The delay between both steps may be a significant time interval compared to the time necessary to form the film from the solution. This interval depends typically on the user's expectations. Considering the physical phenomenon corresponding to the formation of a film from a surface active solution, it is known that the concentration of solvent present inside the film decreases with time thereby modifying the properties of the film as well as its qualification. Different stages of evolution of a free film, such as the common black film (CBF) and the Newton black film (NBF), may be encountered.

It is thus possible to realize the deposition when the film adopts a particular morphology. Thus for instance, when the film is formed from the solution it is possible to follow the evolution of its thickness by simple optical observation. Draining the solvent from the film, by known fluid phenomena (capillarity, gravity and diffusion), generally leads to a reduction in thickness of the film, In the case of a film in the form of an essentially hemispherical bubble the phenomenon is observed on the apex of the hemisphere, it corresponds to a change of state of the thin film containing a significant proportion de solvent towards a Newton black film. The film is then too thin to reflect the visible light.

Generally speaking the thickness of the film ranges between 1 and 100 nanometers, and more particularly from one to a few ten nanometers according to whether it is an NBF or a CBF. The film generally contains a very limited amount of solvent which is maintained particularly strictly and partakes of the cohesion of the whole structure, by way of example for films obtained in water, the water layer will a few angstroms thick for an NBF and a few hundred angstroms for a CBF. The surface covered by a film after deposition is the order of the $cm^2$.

According to a particular embodiment the film is deposited preferably when it is in the form of common black film or Newton black film, more particularly Newton black film. The deposition in the form of an NBF confers greater stability to the film and enables in particular to keep the established organization among the molecules of which it is composed. The use of a porous film formation means facilitates the drainage of the thickness of the film and enables to obtain rapidly a Newton black film. The time period between the formation and deposition step generally corresponds to the drainage time of the solvent. For a hemispherical film of approximately 2-3 cm in diameter the drain time to obtain the structure of an NBF is often smaller than 15 minutes. According to the experimental conditions it may however be more significant and take up to a few hours. The analysis of the film deposited by surface survey techniques such as atomic force microscopy or still the use of the reflectivity of the X-rays will enable to control the type of structure obtained.

It is also possible to deposit thicker films (from 25 to 50 nm) whereof the colour observed is silver grey, on the surfaces. The film thus deposited is quite homogeneous.

The solution may contain moreover salts so as to modify the ionic force of the solution. The variation in the ionic force may enable to switch from the state of metastable equilibrium of a common black film (CBF) to a Newton black film (NBF).

When contact is made between the film and the substrate, molecular interactions enabling strong adherence are established. Contact is made typically using the relative movement of the substrate and of the surface of the film and up to complete deposition of the film. The deposition is complete when the film is not bound to the surface of the solution or to the means of formation of film or to the means of deformation of the surface any longer. The phenomenon is generally rapid at macroscopic scale and seems spontaneous, it corresponds to what seems to be sudden rupture of the surface of the film extending between the substrate and the surface of the solution or the film formation means. For instance, in the case of a macroscopically planar substrate placed in contact with a film in the form of a bubble, the formation of a roughly cylindrical volume extending from the surface of the substrate up to the surface of the solution or the film formation means can be observed.

It should be noted that the drain of the film may also take place on the substrate, solely the solvent molecules bound to the polar heads remain definitely trapped in the film.

The method is generally conducted under normal temperature and pressure conditions (NTPCs), it is nevertheless possible to vary these parameters as the user wishes. The temperature has generally little incidence when the method is performed under the NTPCs (for small variations in temperature), the surfactant should preferably be soluble at the temperature at which the method is performed. It is possible to vary the temperature of the film more specifically by using a device generating infrared radiations close to the film. Such a treatment generally leads to localized narrowing in thickness of the film, in particular in the case of the common black films, nevertheless the film, if it is already in a configuration of equilibrium, generally recovers its configuration as soon as exposure ceases.

The invention also corresponds to a method for depositing a thin nanometric film containing molecular entities on a substrate from a liquid solution containing at least one surfactant at a concentration greater than or equal to the critical micelle concentration (cmc) and molecular entities. The method is realized according to the modalities presented previously, the solution for forming the film including in such a case the molecular entities.

The molecular entities are selected as the user wishes for instance among the entities whereof the size does not exceed a few hundred angstroms and in particular among organic molecules, such as proteins or biological entities, inorganic nanoparticles, combined organic-inorganic entities or a mixture of these entities. Preferably these entities will be soluble in the solvent, i.e. their solubility will be greater than or equal to $10^{-4}$ mol·$L^{-1}$.

The molecular entities considered as insoluble should desirably be solubilized in the solution, also, it is recommended that the solution contains a solubilization surfactant. In relation with his general knowledge, the man of the art, in particular regarding hydrophilic and hydrophobic interactions, is able to determine the type of structure necessary to that end. Preferably the solubilization surfactant will only have few interactions with the film forming surfactant.

Thus, for instance, the surfactant may be selected among those presented above and the solubilization surfactant among the "orthogonal" surfactants, i.e. which do not have a strong affinity, as the fluorinated surfactants are orthogonal relative to the non-fluorinated surfactants. By way of example, water-insoluble membranar proteins in the presence of a fluorinated surfactant might be solubilized by a non-ionic solubilization surfactant.

The molecular entities probably diffuse from the solution towards the film by reason of the difference in chemical potential of the entity in the film and in solution as postulated by Petkova et al. for proteins in particular in Colloids and surfaces A, 2001, 190, 9-16 and by Benattar et al. in Phys. Rev. Lett., 1999, 82, 26, 5297-5300.

According to the inventors the organic molecules are selected in particular among proteins and cellulose fibers. As regards inorganic nanoparticles it is possible to employ structures such as nanotubes, for instance carbon, silicon or silicon carbide nanotubes, luminescent nanopowders, for instance silicon, fullerenes, metal particles (silver, platinum, palladium, gold), aggregates (gold, silica . . . ), quantum dots (composed of semiconductor). Advantageously it will be metallic inorganic nanoparticles, such as gold and silver, including a possible organic coating, such as coated platinum particles, organic nanoparticles like carbon nanotubes or fullerenes and semi-conducting inorganic nanoparticles like silicon nanoparticles.

According to the quantity of solvent present in the film the molecular entities will be in an environment liable to promote self-organization. Typically, the closer the structure of the film to that of a Newton black film the more the molecular entities will have a tendency to self-organize. This phenomenon is probably due to a reduction in the degrees of freedom of the molecular entities which adopt a minimal configuration of energy corresponding to a structure which it is possible to qualify generally as a two-dimensional network according to its thickness. When a solubilization surfactant is used it is also integrated in this "network".

The solution may contain moreover salts so as to modify the ionic force of the solution. The variation in ionic force has generally a few consequences only on the structure of the film, it enables however to modify the chemical potential of the species present in the medium as that of the molecular entities.

The solution may contain moreover salts so as to modify the ionic force of the solution. According to the experimental conditions, the variation in the ionic force may enable to switch from the state of thick film (non block) with a common black film, to a Newton black film.

The invention also corresponds to a method of analyzing molecular entities arranged within a film deposited on a substrate, said film being obtained from a liquid solution containing at least one surfactant and molecular entities, said film being obtained according to the arrangements presented, characterized in that a surface analysis means is used on the film.

After deposition of the film on the substrate according to the modalities presented previously it is possible to use any means of analysis compatible with the substrate, in that analysis is possible by this technique on the surface of such a substrate, so as to determine particular data in particular on the structure of the molecular entities as well as on the interactions which they develop relative to one another. Surface analysis techniques, generally from molecular scale to atomic scale, such as the use of the X-rays in reflectivity and in diffraction, plasmon resonance, electronic microscopy, atomic force microscopy (AFM), are applicable within the framework of the invention. It is thus possible to determine the structure of a molecular entity like a protein by such a method. Such a method also enables to determine whether molecular entities self-organise spontaneously in a film according to the invention, indeed, an analysis of the film deposited enables to detect the degree of organisation in particular thanks to the techniques previously mentioned and more particularly with AFM and the X-ray reflectivity.

The invention also relates to the substrates covered with a film obtained by any of the processes exposed above as well as its usage in any technical field and in particular in electronics, optics, catalysis, sensors, biology, cosmetics.

The devices for the implementation of the processes described previously are also included in the present invention. Thus the invention also relates to devices for depositing thin nanometric films on a substrate from a liquid solution containing at least one surfactant, characterized in that it includes:
- a means (3) of forming a film from the surface of the solution, and
- a means (4) of deforming the surface of the film formed from the surface of the solution.

The device generally contains a reaction cabinet isolated from the external medium, it is preferably sealed and transparent to enable optical follow-up of the method. The means of formation of a film and of deformation of the surface correspond to those defined previously, they may be mixed up. A drainage means may also be provided, i.e. generally pores arranged in the means of deforming a film from the surface of the solution, it may also mean an infrared radiation device for instance. The device may moreover include analysis means as defined above.

The invention is particularly advantageous since it enables in particular to deposit efficiently films of complex nature on surface areas of several square centimeters. Such films may contain varied molecular entities arranged in a dense and solid network. The interactions developed between the film and the surface of the substrate ensure significant cohesion and resistance to the film.

It also enables to deposit a molecular entity of a solution towards a substrate while isolating it from the external medium thanks to the surfactant. The molecular entity in solution is protected from the solvent/external medium interface by the Langmuir film developing at the surface of the solution. then, after deposition, for instance in an NBF, by the surfactant walls.

BRIEF DESCRIPTION OF THE SEVERAL VIEWS OF THE DRAWINGS

The invention will be understood better it the light of the following figures and examples which illustrate it in non-limiting fashion.

DETAILED DESCRIPTION OF THE INVENTION

A surface active solution (1) may be prepared from $C_{12}E_6$ (hexaethylenemonododecyl glycol ether) directly commercially available from SIGMA (Steinheim, Germany) without any additional purification. Such a compound is known to form good quality black films under relatively soft conditions.

The solvent selected is generally water, it is desirable to use particularly pure water, often commercially available. The surfactant may be present in a wide range of concentration greater than the cmc, thus a concentration of 0.5 mg·ml$^{-1}$, which corresponds approximately to fifteen times the cmc under NTPCs, enables to obtain stable NBFs with large surface area. The temperature ranges generally between 22 and 25° C. and the solution is mixed by a magnetic agitator to obtain a uniform solution, colourless. The solution may also be filtered before being used for eliminating possible impurities.

The substrate (2) may consist of silicon, it is generally a wafer, typically used in the electronic industry. Thus a silicon substrate, of type n, whereof the surface whereon the idea is to deposit the film may be in particular Si (111). The substrate may obviously have been subjected to particular doping inasmuch as it would be desirable to confer particular properties thereto, in particular electronic properties (n or p-type doping with different elements). The substrate has a diameter of approximately 5 cm.

The surface is advantageously cleaned, to that end a "piranha" solution may be employed. It consists of sulphuric acid and peroxide with 33% hydrogen (for instance in a ratio of the order of 3:1).

It is also desirable to subject the surface to a treatment to make it hydrophobic, thus using an aqueous $NH_4F$ (40%) solution for approximately 20 minutes. Pure water rinsing is then performed then the surface is dried under Argon. After this treatment the surface is H-terminated.

Figure 1:
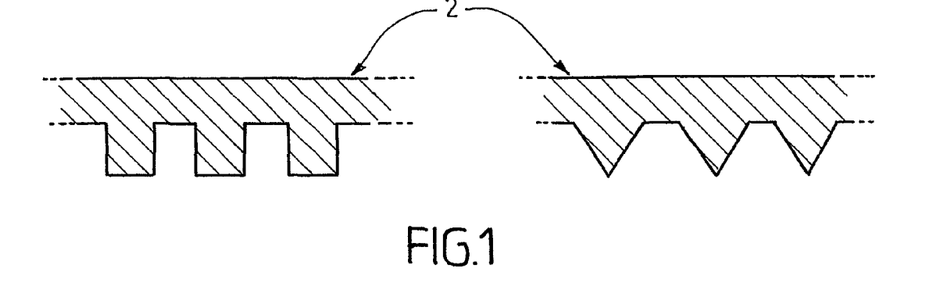
FIG. 1 is a schematic view of a diagrammatic representation of different surface topographies for a substrate (2).

Besides, the surface may be wrought so that it exhibits a particular topography and thus be ribbed, undulated or still filled with asperities as illustrated on FIG. 1. According to the type of method employed, the surface bulges may be at macroscopic scale or smaller, abrasion techniques known in the field of materials may be employed. At a microscopic level and below, it is known that the use of masks, oxidant or still photosensitive resins enables to obtain surface bulges.

The method is in particular implemented using a device comprising a means (3) of forming a film from the surface of the solution as well as a means (4) of deforming the surface of the film formed from the surface of the solution, mixed up (5) or not. Such devices are illustrated on FIG. 2.

Figure 2A:
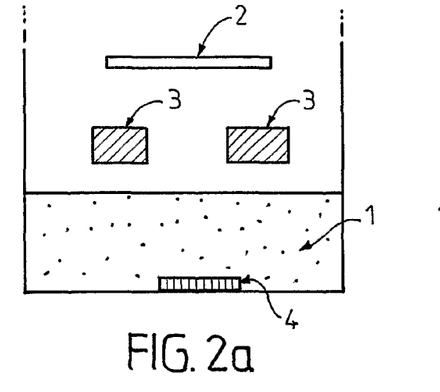
FIG. 2 is a schematic view of a diagrammatic representation of different devices useable according to the method.
Figure 2B:
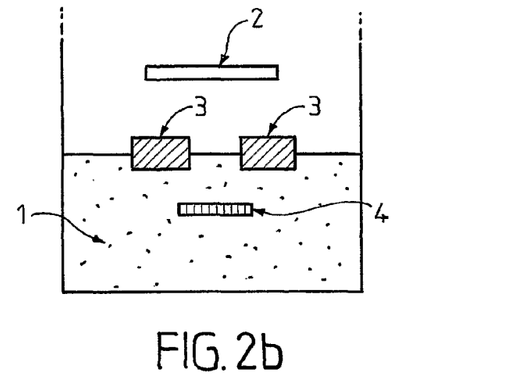
Figure 2C:
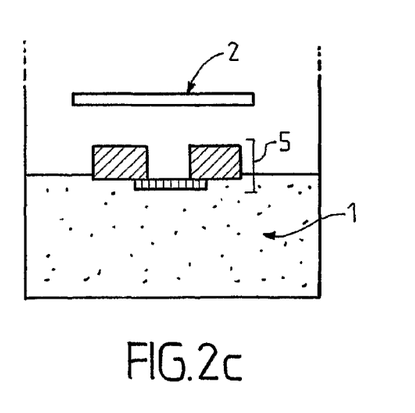
Figure 2D:
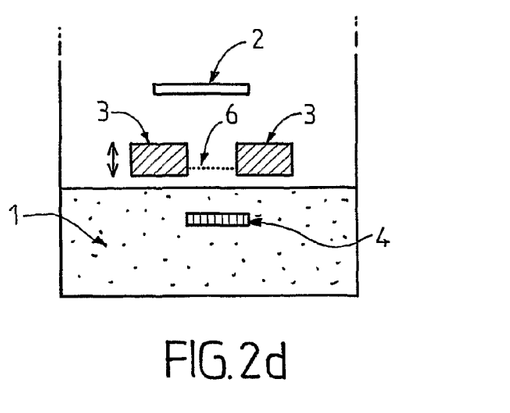
Figure 2E:
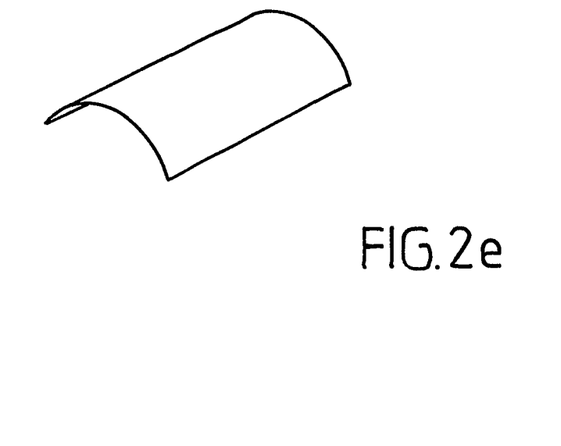

FIG. 2a represents a reaction cabinet comprising the device, in this configuration the means (3) of forming the film is not in contact with the solution (1), it may be set in motion for making contact with the solution and enable the formation of a film. The means generally consists of a material compatible with the solution and in particular hydrophilic such as sintered glass (borosilicate). The solution may also be set in translation. Once the film has been formed, the means of deforming its surface may be used, on the figure it has been placed in the furthermost portion of the cabinet, it may obviously be arranged somewhere else, as is the case on FIG. 2b, inasmuch as it still ensures the deformation of the film. On FIG. 2b the means (3) is in contact with the solution, on FIG. 2c the means (3) and (4) are mixed up into a single means (5) of forming the film and of deforming its surface, FIG. 2d illustrates an example of forming the film (6) from the surface of the solution.

The deformation means (4) generally consists of a gas input. The use of a gas is particularly appreciated since it enables, in particular, to obtain simultaneously a film from the surface of the solution while deforming its surface for easier contact with the substrate (2). The use of a frame of particular structure also enables to obtain films whereof the surface is not planar and exhibits a characteristic deformation. Thus, a frame (5), illustrated on FIG. 2e, whereof the shape is substantially close of that of a semi-cylinder enables to form curved films.

Figure 2F:
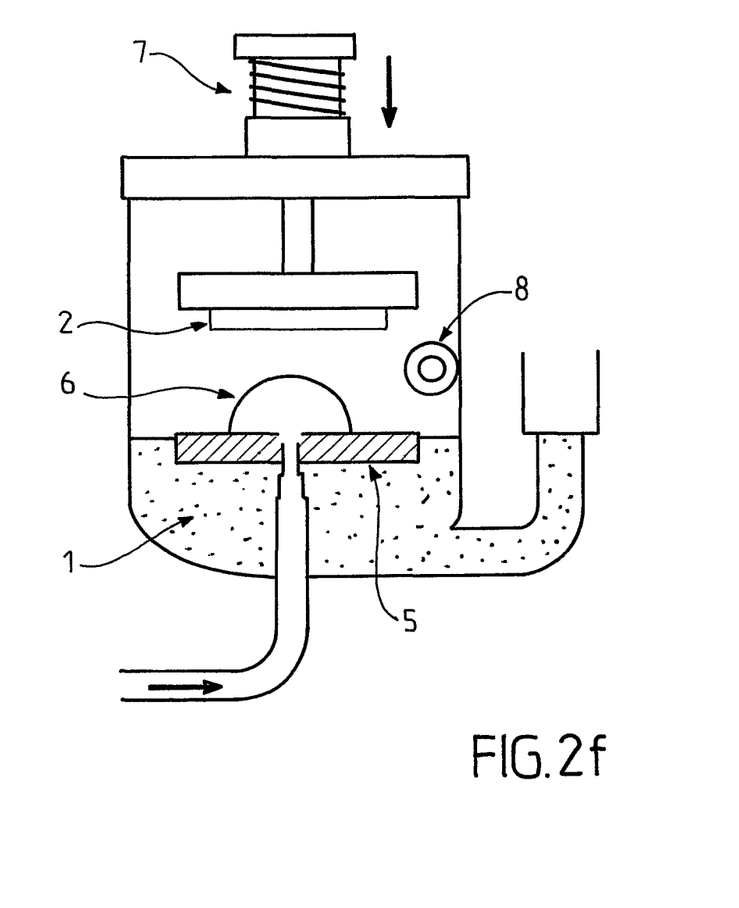

The use of a device as illustrated on FIG. 2f is particularly recommended. The solution is placed in a reaction cabinet so that it is flush with the surface of a porous plate (5) made of sintered glass, wherein a gas inlet is arranged. The injection of a gas, of a composition generally substantially identical to that of the atmosphere in the cabinet, enables the formation of a bubble at the surface of the solution and the pores filling the plate ensure efficient drain of the water contained in the film (6). The injection may be conducted in a controlled fashion and the diameter of the bubble is thus determined perfectly. Means of analysis may moreover be added to the device so as to follow the evolution of the film by optical reflectivity or still by interferometry.

The atmosphere in the cabinet is saturated by the solvent.

No additional salt has been added into the solution, in the case of other surfactants it would have been obviously possible to add salts to the solution.

In the present case, the drain is the order of some fifteen minutes for a film in the form of a bubble of approximately 5 cm in diameter for obtaining an NBF.

The step of contacting the film formed from the solution with the substrate may be realized according to different modalities. Thus a translational movement may be given to the film as well as to the substrate, the surface of the film or of the substrate, when it is possible, may also be deformed.

Figure 3A:
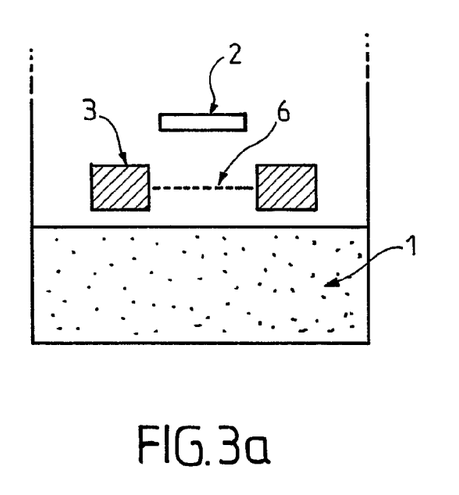
FIG. 3 is a schematic view of an illustration of the formation of a film using a film formation and deposition device.
Figure 3B:
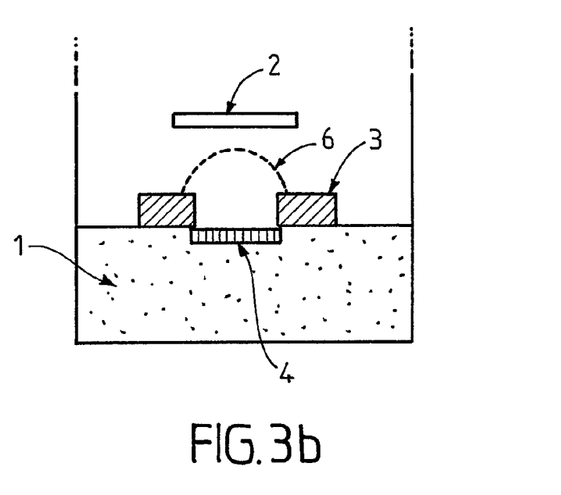

Different contacting modes are illustrated on FIG. 3. Thus, on FIG. 3a, the surface of the film (6) is not deformed, and contact is ensured by a relative displacement of the substrate (2) and of the surface of the film (6), it is desirable in such a case that the respective sizes of the substrate (2) and of the means (3) are suited. FIG. 3b illustrates the deformation of the surface of the film (6) using a means (4) of deformation, contact with the substrate (2) may be performed in such a case by simple deformation but it is also possible to ensure translation of the film (6) or of the substrate (2).

The device illustrated on FIG. 2f corresponds to an embodiment particularly appreciated by inventors. It should be noted in such a case that the substrate (2) is arranged on a means of translation (7) which is generally formed of a jack and a bracket whereon the substrate is placed.

It is preferable to wait for the film (6) to be in the form of NBF before deposition. Calibration may be realized to define the minimum time necessary to the formation of an NBC type film, in particular in case when the user does not wish to conduct any checks, such as an optical check, directly from the process.

A means of analysis (8) may be inserted in the device, it is generally a photographic apparatus or a camera which enable to follow the evolution of the film in real time.

The deposition is generally rapid. As soon as contact is made between the surface of the film (6) and the substrate (2) the film deforms to match the surface of the substrate, it is possible to observe a transition during which a roughly cylindrical film is established as illustrated on FIGS. 4a and b. The film is deposited spontaneously after separation from the means (3) of formation or still from the surface of the solution. FIGS. 4c and d illustrate the deposit more precisely, FIG. 4c represents in particular the surface active molecules forming the film (6) as well as the substrate (2) and the means (5) of forming a film and deforming its surface. The film is in the form of a bubble which is placed in contact with the substrate (2). After deposition, a film consisting of a surfactant is arranged on the surface of the substrate (2) as illustrated on FIG. 4d, at macroscopic scale the experimenter will notice a qualifiable "burst" phenomenon of the bubble when the film is deposited.

After deposition, it is possible to perform an analysis of the surface in particular with an AFM, a TEM (transmission electron microscope), a SEM (scanning electronic microscope) or still using X-rays. The use of X-rays enables to obtain structural information along an axis perpendicular to the plane of the film. Atomic force microscopy or electronic microscopy delivers information on the topographic structure of the film deposited.

Figure 5:
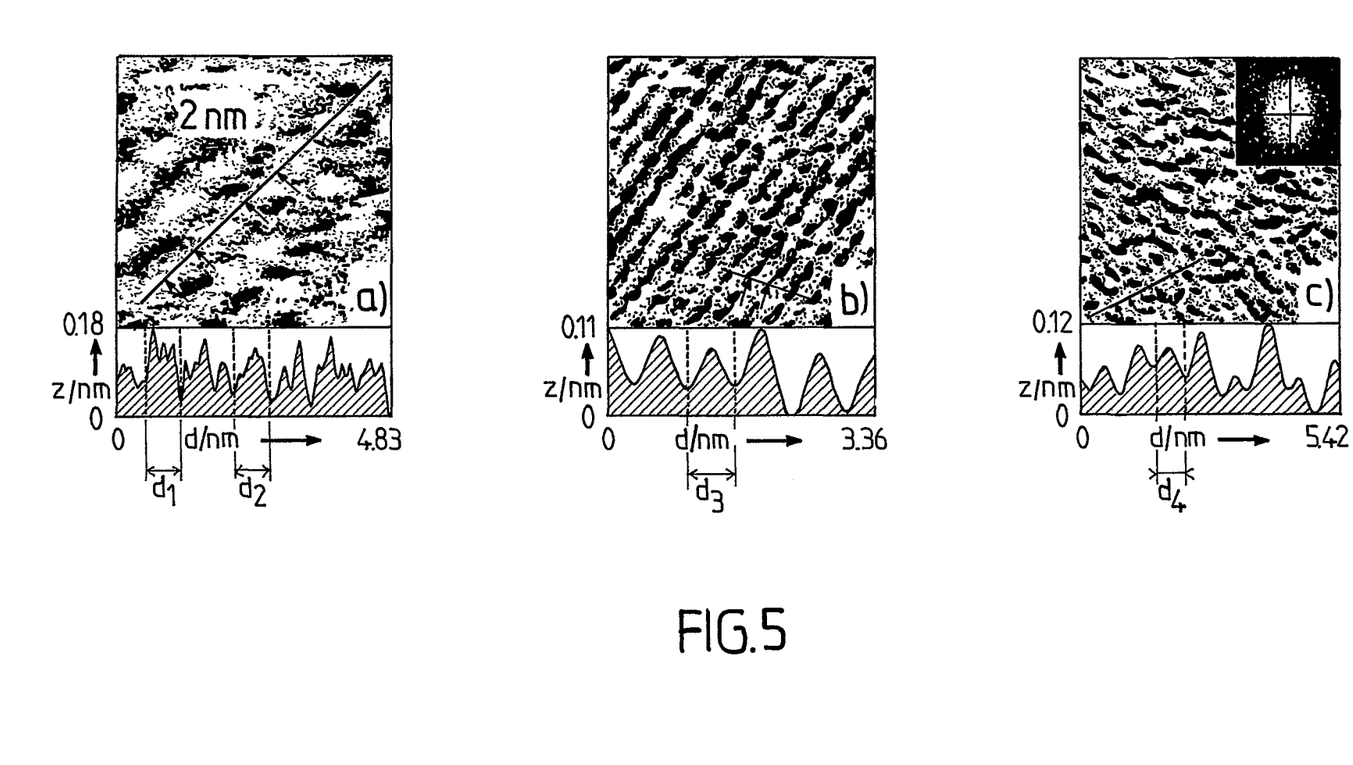
FIG. 5 are images obtained by AFM of the surface of an NBF after deposition on a substrate (2).

FIG. 5 represents topographic images obtained by AFM (Seiko Instruments, Chiba, Japan, SPA300HV) fitted with a tip of silicon-plated platinum, the latter is applied with a load of 0.03-0.08 N·m$^{-1}$, the radius of the tip is approximately 32 nm. AFM is used in contact mode. FIGS. 5a to 5c correspond respectively to analyses on surface areas of 4×4, 8×8 and 12×12 nm$^2$. The data show that the NBF deposited keeps the order which is typically associated therewith before deposition, i.e. a long distance order.

The introduction of molecular entities in the film is generally made by injecting the desired entities into the solution as shown in the literature in particular for membranar proteins. The operating conditions applicable in the case of membranar proteins are useable within the framework of the present method. After deposition of the film the proteins exhibits a characteristic arrangement substantially identical to that adopted before deposition. The molecular entities present in the film form an essentially bidimensional true network.

Figure 6A:
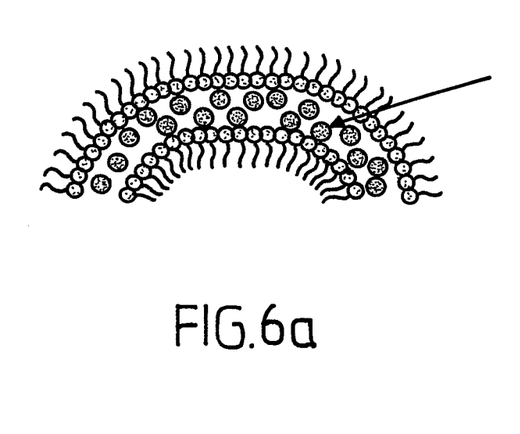
FIG. 6 is a schematic view of a diagrammatic representation of the preparation of film including molecular entities.
Figure 6B:
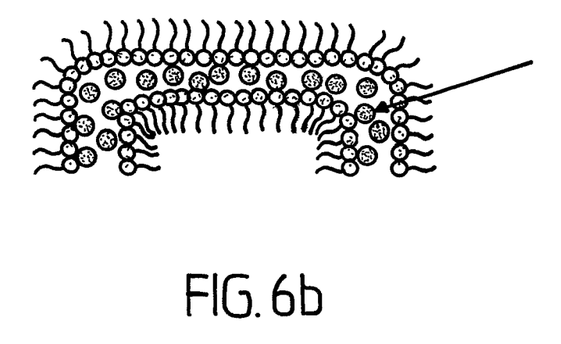
Figure 6C:
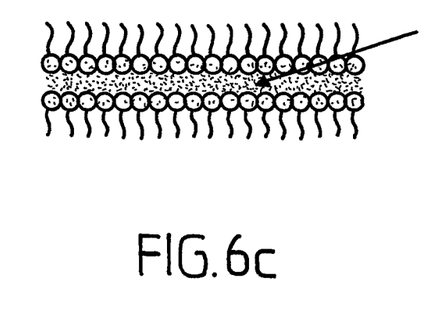

The mechanism of formation of the film is the same as in the absence of molecular entities. As illustrated on FIG. 6, whereon an arrow indicates the molecular entity, there is first of all the formation of a bubble containing molecular entities (FIG. 6a), drainage and coming close to the substrate, adherence of the bubble to the substrate, subsequent formation of a cylinder (FIG. 6b), then deposition of the film containing molecular entities (FIG. 6c).

In order to illustrate this aspect of the invention examples of introduction of metallic nanoparticles are presented below (gold, silver), of coated metallic nanoparticles (platinum core), of semi-conducting nanoparticles (silicon), of carbon nanotubes and of fullerenes. The particle-frees films have been realized under the same conditions so as to have a comparative reference.

The silicon nanoparticles employed had a diameter ranging between 5 and 16 nm, they are similar to those obtained by the protocol described by Lacour et al. in Physica E 38 (2007) 11-15. The nanoparticles of gold and silver with a diameter ranging between 5-10 nm have been purchased from BBInternational™. Other nanoparticles of silver have been employed, they have been synthetized while conducting a reduction of silver salts by UV-irradiation or by chemical reaction with a strong reductor (NaBH$_4$), whereas the average diameter has not been characterized accurately but lies between 5 and 20 nm. These different nanoparticles are hydrophilic, they have been solubilized in water. The silicon nanoparticles have also been solubilized in ethanol then added to an aqueous solution of non-ionic fluorinated surfactants C$_6$F$_{13}$SOTHAM at 0.5 g·l-1, whereas ethanol has then evaporated from the solution almost completely. The particles being hydrophilic, it is also possible to solubilize them directly in an aqueous solution of non-ionic fluorinated surfactants C$_6$F$_{13}$SOTHAM at 0.5 g·l-1, for instance in the presence of ultrasounds.

The nanoparticles of platinum which have been employed are those described in the thesis (Langmuir-Blodgett films based on nanoparticles of platinum with modified organic coating: elaboration, characterisation and electrochemical behaviour, presented by Sara Cavaliere-Jaricot on 10 Feb. 2006, Université de Versailles Saint-Quentin-en-Yvelines). They have been solubilised in an aqueous solution of fluorinated surfactants C$_6$F$_{13}$SOTHAM.

The buckminsterfullerene, C60 fullerene, was purchased from SIGMA, the carbon single-wall nanotubes (SWNT) with an average diameter of 1 nm and an average length of 200 nm were purchased from CNI Carbon Nanotechnologies Inc, 16200 Park Row, Houston Tex. 77084, USA. The fullerenes and the carbon nanotubes are hydrophobic, and have been solubilised with SDBS for the nanotubes and Triton X 100™) for the fullerenes. The fullerenes have first of all been dispersed in toluene before being dispersed in an aqueous solution of surfactant.

The examples presented have been realized with water by way of solvent, similar results are obtained with a water/ethanol mixture 99:1 in volume. The surfactants, and their concentration, used according to the molecular entities are presented in table 1.

| PARTICLE | SURFACTANTS | CONCENTRATION OF SURFACTANT |
|---|---|---|
| Gold | C$_6$F$_{13}$SOTHAM | 0.5, 0.9 and 1 g·l$^{-1}$ |
|  | C$_{12}$E$_6$ | 0.5 and 1 g·l$^{-1}$ |
| Commercial silver | C$_{12}$E$_6$ | 1 g·l$^{-1}$ |
| Synthetised silver | C$_6$F$_{13}$SOTHAM | 0.5 or 1 g·l$^{-1}$ |
|  | C$_{12}$E$_6$ | 0.5 g·l$^{-1}$ |
| Silicon | C$_{12}$E$_6$ | 1, 0.08, 0.16 and 0.4 g·l$^{-1}$ |
|  | C$_6$F$_{13}$SOTHAM | 0.5, 1 and 6.4 g·l$^{-1}$ |
| Platinum | C$_6$F$_{13}$SOTHAM | 0.5 g·l$^{-1}$ |
| Nanotubes | SDBS | 2.4 g·l$^{-1}$, 5 times the CMC |
| Buckminsterfullerene | Triton X 100 | 1.25 g·l$^{-1}$, 10 times the CMC |

The solutions have been prepared by mixing the particles with the solvent then by adding the surfactant or by addition of the nanoparticles to the solution of solvent containing the surfactant, they have been homogenized by brief application of ultrasounds.

Figure 4A:
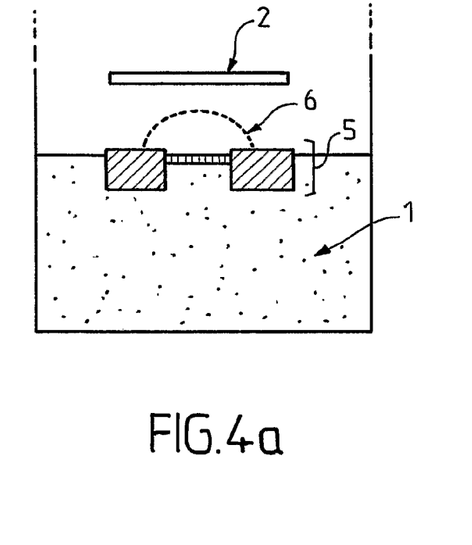
FIG. 4 is a schematic view of an illustration of the step of depositing a film.
Figure 4B:
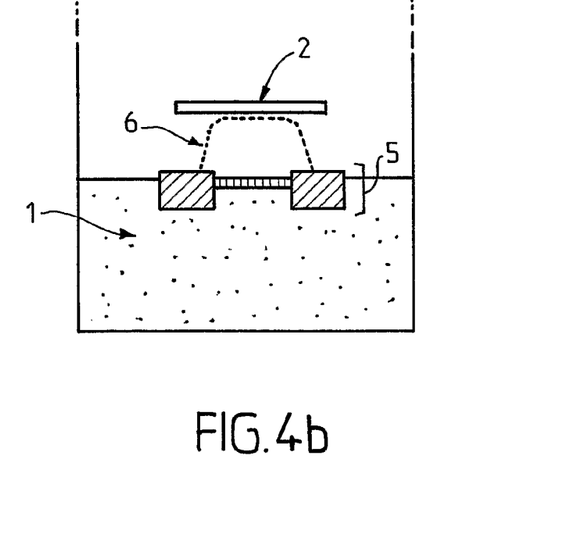
Figure 4C:
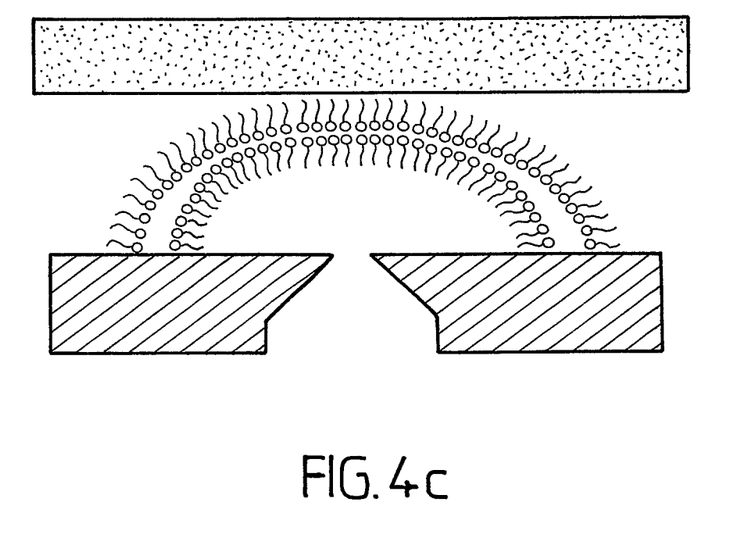
Figure 4D:
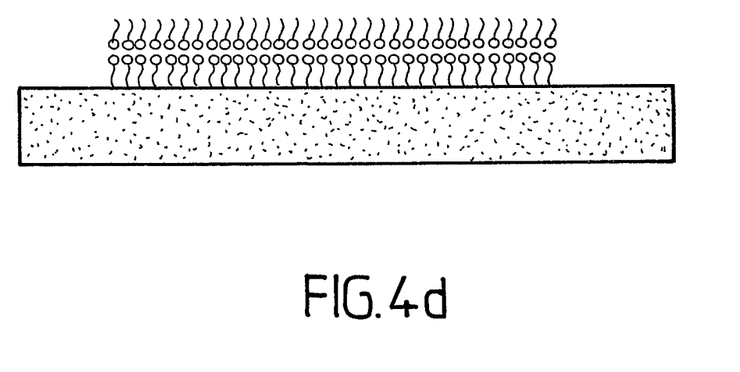

The film has been prepared thanks to different devices whereof the operating principle is similar to that illustrated on FIG. 4a. Alternately, a solution-impregnated porous material or a filter paper (renewed at each experiment after each experiment) on a Büchner funnel or in a solution-impregnated crystallizer have been used successfully. The Büchner funnel can advantageously be cleaned easily relative to the porous material. Indeed, the nanoparticles sneak into the pores of the porous material and are hence very difficult to clean.

The bubble intended for forming the film was made that either using an air-filled syringe, at constant speed using a syringe-pusher; or from a plastic (disposable) pipette dipped in a little quantity of solution. Both methods have led to the same type of film after analysis, whereas the film was deposited at the same stage of drainage of the bubble.

The deposition was made when the film was very thin: after formation of the bubble, a change in color can be observed and when the film has a grey or black appearance to naked eye it may be deposited. Under these conditions its thickness is smaller than 50 nm after analysis, with a bubble covering a surface area of 1 to 5 cm$^2$. The atmosphere employed was saturated with solvent. The presence of nanoparticles has no visible influences.

By way of substrate, silicon boards treated with NH$_4$F (<<wet chemical etching>> so that they are hydrophobic), or silicon or glass silanized boards (grafting of alkyl chain on the oxide surface) have been employed. The silicon boards used (of orientation 111 for NH$_4$F etching, 111 or 100 for silanization) have a thickness of approximately 5 cm and a surface area of 12×24 mm$^2$.

The silicon boards or the glass plates have been cleaned in a first step in boiling acetone, then in pure water (milliQ™), in piranha (mixture of sulphuric acid and oxygenous water) then rinsed abundantly in pure water (milliQ™) and optionally dried using a nitrogen flow in case of silanization).

The NH$_4$F treatment was conducted with a 40% aqueous solution in water, commercialized by Sigma Aldrich™. The silanization of the boards was conducted with octadecyltrichlorosilane (Sigma Aldrich) at 5 mM in a mixture of 30% chloroform in volume and 70% hexadecane or toluene in volume.

The examples were conducted at a temperature ranging between 22 and 25° C.

The gold particles are synthetized by the manufacturer from an aqueous solution of 0.01% gold chloride in mass, the calculations of concentration of particles are hence based upon derived values. Solutions of gold particles were prepared by dilution of the solution purchased at the following concentrations: $5 \cdot 10^{-5}$, $10^{-5}$, $10^{-6}$, $10^{-7}$, $10^{-8}$, $10^{-9}$ g·ml$^{-1}$.

Figure 7A:
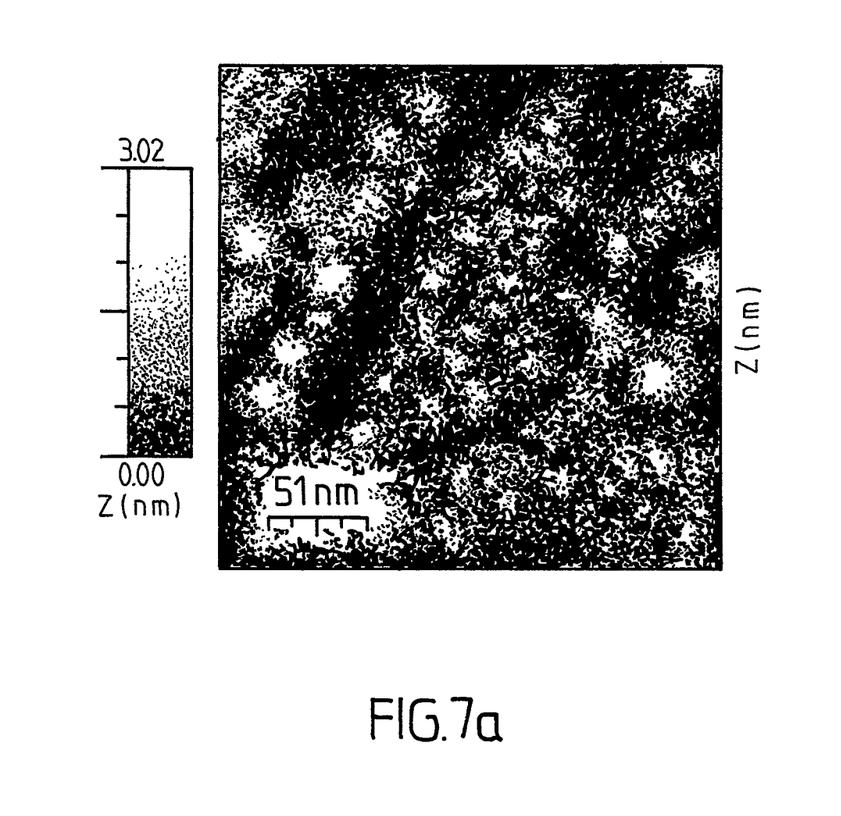
FIG. 7 are images obtained by AFM of the surface of an NBF after deposition on a substrate (approximately 250×250 nm), the film including gold particles, the image in (a) corresponds to a view above the surface covered by the film and in (b) to profile matching the mark on Figure (a).
Figure 7B:
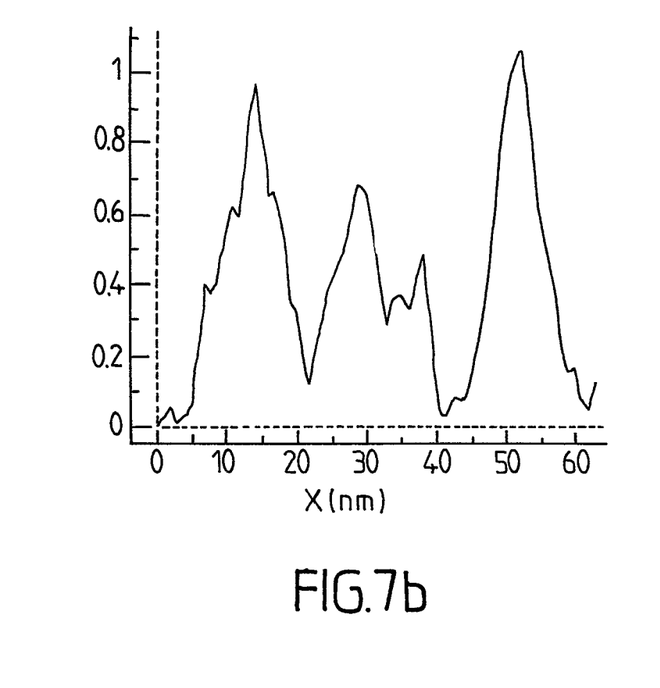

The presence of nanoparticles in the film could be observed with AFM and by X-ray reflectivity. FIG. 7a represents an AFM image as can be obtained. The profilometric analysis, illustrated on FIG. 7b from a cross-section on FIG. 7a (dash), shows a short distance organisation of the particles, the monolayer distribution of the particles is largely observed.

Solutions containing commercial silver particles were prepared by dilution at the following concentrations: $5 \cdot 10^{-5}$ mol·l$^{-1}$, $10^{-4}$ mol·l$^{-1}$. The synthetized particles were prepared from an AgNO$_3$ solution with 0.1 or 0.4 g·l$^{-1}$ concentration.

The presence of nanoparticles in the film could be observed with AFM and by X-ray reflectivity as was done for gold particles.

The particles of platinum were introduced into the solution with the following concentration: 0.5 g·l$^{-1}$.

The presence of nanoparticles in the film could be confirmed thanks to AFM and by X-ray reflectivity as was done for gold and silver particles.

The particles of silicon were introduced into the different solutions with the following concentrations: 0.5 g·l$^{-1}$, 0.1 g·l$^{-1}$, 0.25 g·l$^{-1}$.

Figure 8:
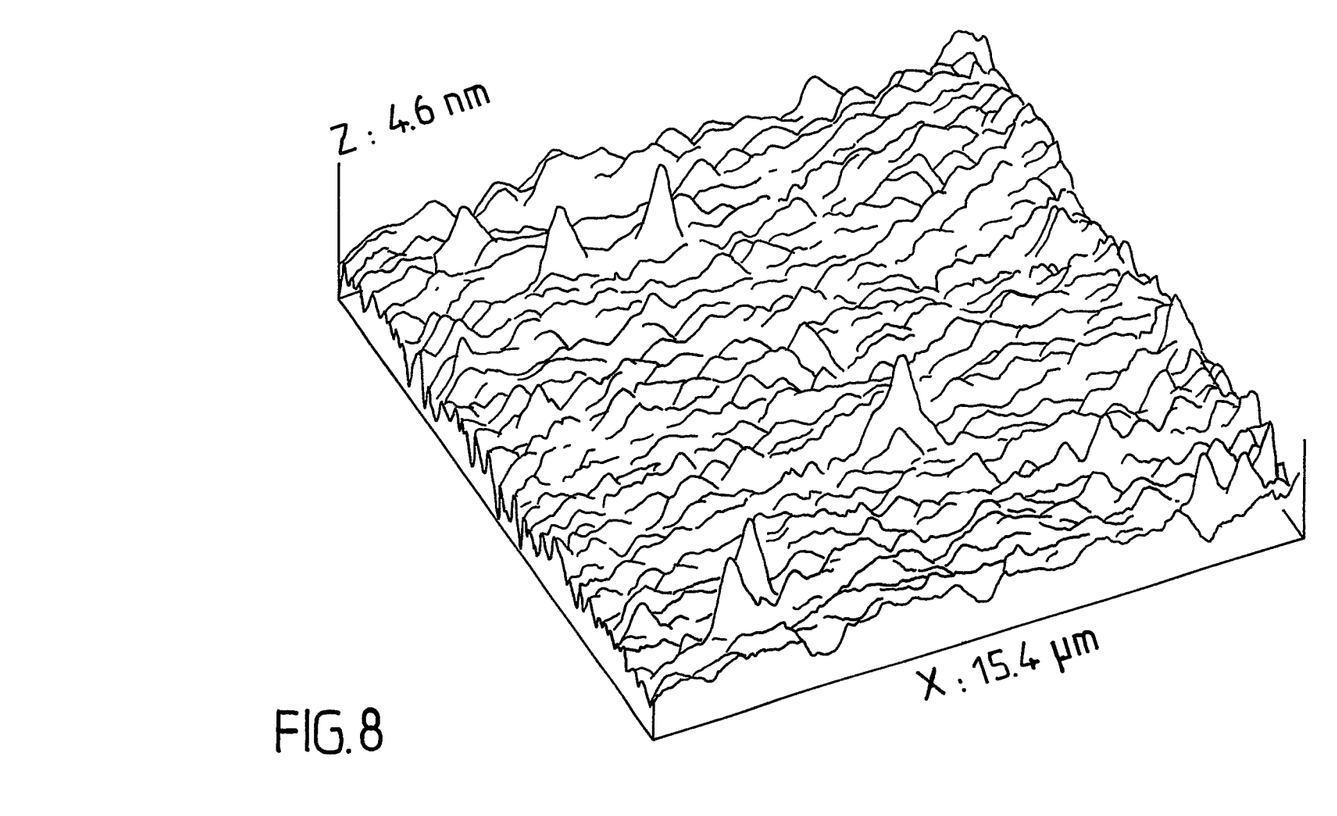
FIG. 8 is an illustration of mapping obtained by AFM of the surface of an NBF after deposition on a substrate (surface of 15.4×15.4 µm approximately), the film including silicon particles.

The presence of nanoparticles in the film could be confirmed thanks to AFM and by X-ray reflectivity as was done for gold, silver and platinum particles. Individual nanoparticles inserted in the film, whereof the height is expected, when the concentration of silicon is low (0.1 g·l$^{-1}$) have also been observed. FIG. 8 represents a mapping obtained by AFM for a concentration of 0.1 g·l$^{-1}$. The isolated distribution of the particles which correspond to the highest peaks can be noticed. Isolation of the particles in the film enables to study their properties.

The carbon nanotubes were introduced into the different solutions with the following concentrations: 0.1 g·l$^{-1}$.

Buckminsterfullerene was introduced in the solution with the following concentrations: from 0.1 to 0.25 g·l$^{-1}$.

The formation of film could also be observed for these entities.

As appears above it is possible to deposit easily films of nanometric thickness containing molecular entities on different types of substrate. It is moreover also possible to obtain entities exhibiting an organization within the film as appears from the previous examples.

I claim:

1. A method for depositing a black film on a substrate from a liquid solution containing at least one $C_{12}E_6$ surfactant at a concentration greater than or equal to the critical micelle concentration (cmc), the method comprising the following steps:
    forming a black film from a surface of the solution by (i) immersing into the solution a solid frame having a perimeter within which an empty space is provided and (ii) displacing the surface of the solution relative to the empty space so that a black film is formed within the empty space;
    contacting the substrate with the formed black film; and
    depositing the formed black film on the substrate.

2. The method according to claim 1, wherein the solution comprises a polar protic solvent.

3. The method according to claim 1, wherein the solution comprises a solvent selected from the group consisting of water, toluene, acetic acid, methanol, ethanol, acetonitrile, dimethylformamide and mixtures thereof.

4. The method according to claim 1, wherein the surfactant concentration ranges between cmc and one hundred times the cmc value.

5. The method according to claim 1 wherein the method is carried out under a solution solvent-saturated atmosphere.

6. The method according to claim 1, wherein the solution has a contact angle θ of greater than or equal to 90° relative to the substrate.

7. The method according to claim 1, wherein the substrate is comprised of a metal, a metal alloy or a semiconductor.

8. The method according to claim 1, wherein the substrate is an organic polymer or a biological material.

9. The method according to claim 1, wherein the substrate is planar at a macroscopic scale.

10. The method according to claim 1, wherein the step of forming a black film from the solution is carried out using mechanical action for moving the solid frame relative to the solution to provide said immersing of the solid frame and said displacing of the surface of the solution relative to the empty space.

11. The method according to claim 1, wherein the step of forming a black film from the solution is carried out by moving the solution relative to the solid frame to provide said immersing of the solid frame and said displacing of the surface of the solution with the solid frame so that the surface of the solution is displaced relative to the empty space.

12. The method according to claim 1, wherein the step of forming a black film from the solution is carried out using a solid frame configured in a shape that enables formation of non planar films.

13. The method according to claim 1, wherein the step of forming a black film from the solution is carried out using a mechanical action of a gas to displace the surface of the solution relative to the empty space of the solid frame.

14. The method according to claim 1, wherein the solution comprises molecular entities.

15. The method according to claim 1, wherein the solution includes molecular entities that have a size does not exceed a hundred Angströms.

16. The method according to claim 1, wherein the solution includes organic molecules.

17. The method according to claim 1, wherein the solution includes organic nanoparticles, semi-conducting inorganic nanoparticles which are either metallic or metallic with an organic coating.

18. The method according to claim 1, further comprising a step of:
    analyzing molecular entities arranged within a film deposited on a substrate.

19. The method according to claim 1, wherein the solution includes proteins or cellulose fibres.

20. The method according to claim 1, wherein the black film that is deposited is a common black film.

21. The method according to claim 1, wherein the black film that is deposited is a Newton black film.

* * * * *